United States Patent [19]

Ferguson

[11] Patent Number: 4,722,221

[45] Date of Patent: Feb. 2, 1988

[54] PORTABLE HYDRAULIC TESTER

[76] Inventor: Bruce P. Ferguson, 40 Rimu Street, New Plymouth, New Zealand

[21] Appl. No.: 869,775

[22] Filed: Jun. 2, 1986

[51] Int. Cl.$^4$ .......................... G01L 7/00; G01M 3/26
[52] U.S. Cl. ........................................ 73/168; 73/49.8
[58] Field of Search .................... 73/168, 46, 49.8, 37

[56] References Cited

U.S. PATENT DOCUMENTS

| | | | |
|---|---|---|---|
| 1,298,236 | 3/1919 | McKenzie | 73/46 |
| 4,181,017 | 1/1980 | Markle | 73/168 |
| 4,311,038 | 1/1982 | Dunn | 73/49.8 |
| 4,587,836 | 5/1986 | Hewlett | 73/46 X |

*Primary Examiner*—Daniel M. Yasich
*Attorney, Agent, or Firm*—Murray and Whisenhunt

[57] ABSTRACT

Pressure testing apparatus including a flange locating assembly having a tester flange plate pivotally mounted to a frame, thus enabling presentation of the tester flange plate in at least two angular dispositions to a flange of an object to be tested by a fluid to issue under pressure from the tester flange plate.

8 Claims, 21 Drawing Figures

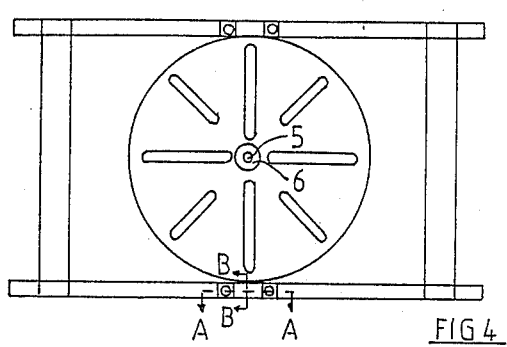
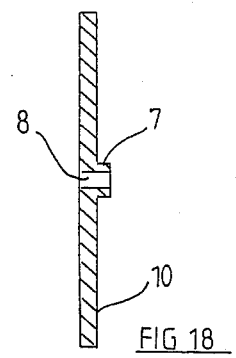
FIG 4
FIG 18
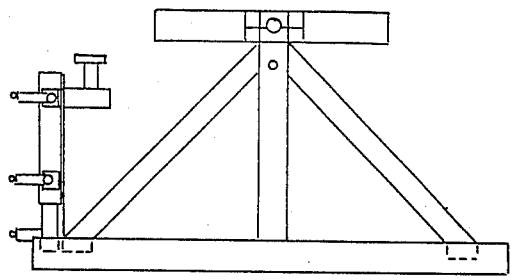
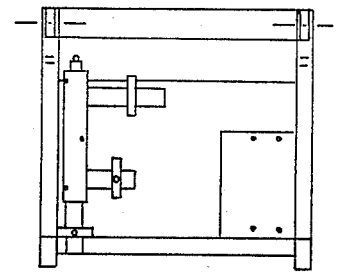
FIG 5
FIG 8
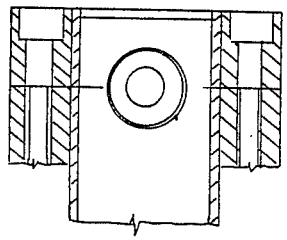
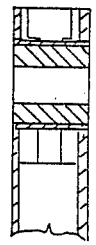
FIG 6
FIG 7
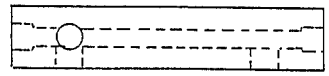
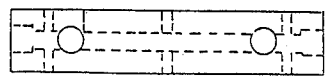
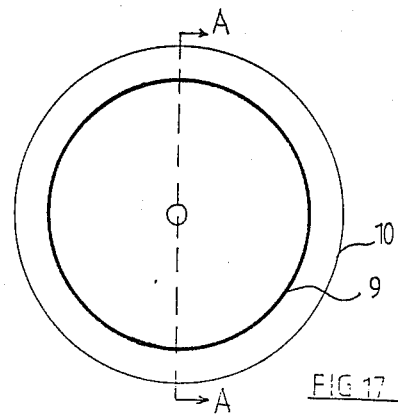
FIG 21
FIG 19
FIG 20
FIG 17

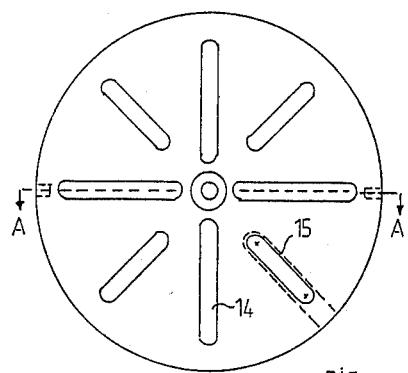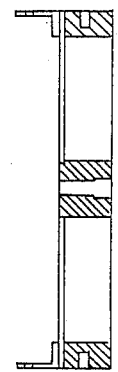
FIG.9    FIG.10
FIG.12 FIG.11
FIG.14 FIG.13
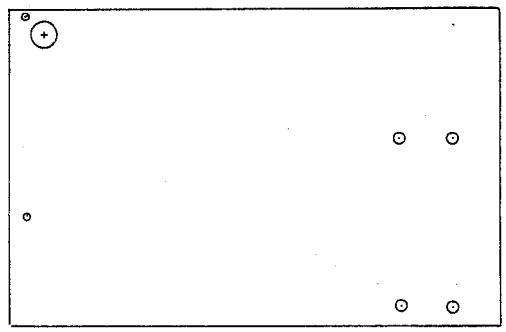
FIG.15
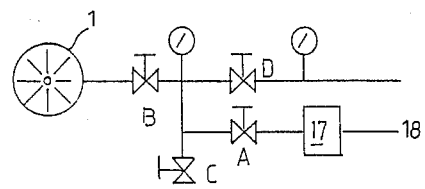
FIG.16

PORTABLE HYDRAULIC TESTER

The present invention relates to improvements relating to pressure testing apparatus and, in particular, although not solely, to a portable hydraulic or pneumatic tester for testing control and relief valves.

BACKGROUND OF THE INVENTION

There is often a need to provide means whereby it is possible to set a relief valve in a pipe line or some other fluid carrying situation, leak test valves, pressure test a pipeline and to calibrate gauges. The present invention provides apparatus suitable in use in at least some of the abovementioned applications.

SUMMARY OF THE INVENTION

Accordingly in one aspect the present invention consists in pressure testing apparatus comprising a stable frame capable of being supported on a substantially flat support surface, a flange locating assembly providing a surface having a pressurised fluid egress port over which a flanged pipe, valve or the like can have its flange held in a substantially fluid tight manner against the surface or any packing means thereon, there being means to allow rotation of the assembly about a pivot axis provided by a pivotal relationship with said frame, means carried by the frame to provide a fluid under pressure or to receive a fluid under pressure and, means providing fluid tight communication of any pressurised fluid generated by or from the means to provide a fluid under pressure or to receive a fluid under pressure so as to issue from the egress port of the assembly, the construction and arrangement being such that in one of at least two angular dispositions of the assembly relative to the frame about the pivot axis a flanged pipe, valve or the like can be tested under a fluid pressure issuing from the egress port.

Preferably the means to provide a fluid under pressure or to receive a fluid under pressure and/or the conduit therefrom is provided with calibration guage means.

Preferably the pivoting assembly is capable of supporting a flanged pipe, valve or the like with the plane of the flange both horizontally and vertically.

Preferably the assembly includes a radially slotted tester flange plate having the radial slots thereof not extending to the outlet or egress port for pressurised fluid, the slots allowing the projection of located bolt means to and through bolt holes included in the flanges of an item to be tested.

Preferably packing means comprising ported adaptor plates are provided for interposition between the surface of the flange locating assembly and the flange of an item to be tested.

Preferably the packing means includes at least one sealing "O" ring about a port to align with the egress port.

Preferably the means providing a fluid under pressure comprises a hydraulic pump and reservoir means carried by the frame.

In a further aspect the present invention consists in the method of testing involving the use of apparatus in accordance with the present invention or when performed in any of the following mentioned ways.

BRIEF DESCRIPTION OF THE DRAWINGS

On preferred form of the present invention will now be described with reference to the accompanying drawings in which:

FIG. 4 is a plan view of the frame only and the pivoted tester flange plate arrangement in accordance with the present invention, FIG. 5 is a side elevation view of the arrangement shown in FIG. 4, FIG. 6 is the section AA of the arrangement shown in FIG. 4, FIG. 7 is the section BB of the arrangement shown in FIG. 4, FIG. 8 is the left hand end elevation end of the arrangement shown in FIG. 5, FIG. 9 is a plan view of the preferred tester flange plate in accordance with the present invention, FIG. 10 is the section AA of the tester flange plate as shown in FIG. 9, FIG. 11 is a plan view of one form of attachment bolt in accordance with the present invention, FIG. 12 is the left hand view of the bolt of FIG. 11, FIG. 13 is a plan view of a different form of bolt to that of FIG. 11, FIG. 14 is the left hand end view of the bolt of FIG. 13, FIG. 15 shows the lay out of the plate useful for locating the gauges etc., of the apparatus, FIG. 16 is a flow diagram, FIG. 17 is a plan view of the O-ring side of a preferred adaptor plate, FIG. 18 is a cross section AA of the plate as shown in FIG. 17 showing a central boss capable of being located downwardly or inwardly into the tester flange plate for accurate coaxial alignment of the various bores or ports and also to ensure the O-ring (if any) provided on the tester flange plate surface acts as a seal against the right hand side of an adaptor plate as shown in FIG. 18 while the O-rings on the other side will provide a seal against the inner regions of a flange to be clamped there against under the action of bolts from the tester flange plate the bolts not contacting the adaptor plate, FIG. 19 is a diagram of a manifold useful for providing the various controlled passage ways, FIG. 20 is another view of the arrangement shown in FIG. 19, i.e. from above and, FIG. 21 is a right hand end view of the arrangement as shown in FIG. 19.

DETAILED DESCRIPTION OF THE INVENTION

Figure 1:
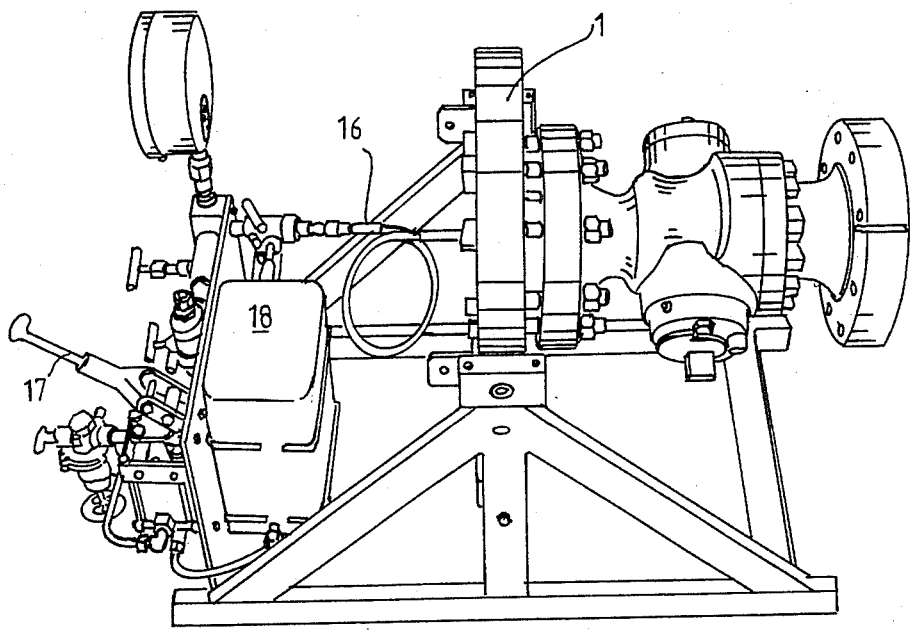
FIG. 1 is a perspective view showing complete apparatus in accordance with the present invention, including a hand operated hydraulic pump capable of pumping a fluid from the reservoir shown via a flexible conduit which is in fluid tight communication with a gauge into the centre of a pivoted tester flange plate to which the flange of a valve to be tested can be mounted in fluid tight relationship with the outlet for the conduit from the tester flange plate.

As shown schematically in FIG. 16, and in FIG. 1, there is provided a there is provided a high pressure hand pump 17 capable of receiving, for example, a water input from, for example, a reservoir 18. The hand pumped liquid can pass via a block valve (A) (FIG. 16) through a conduit in communication with a test pressure valve through a further block valve (B) and into the tester flange plate 1. A drain valve (C) is provided to drain the liquid. Additionally in the preferred form of the invention, nitrogen or other pressurised fluid gas (e.g. from a pressure container) can be fed in via a gauge valve (D) through the block valve (B) and into the tester flange plate.

Figure 2:
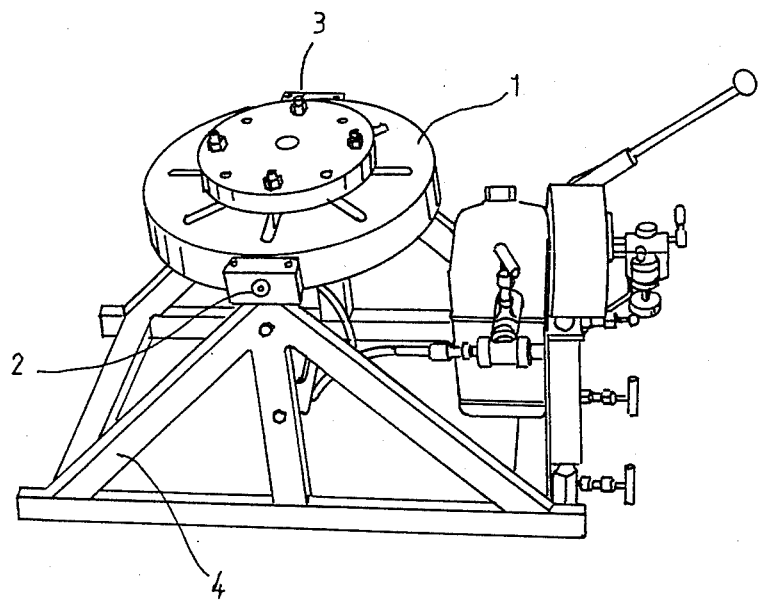
FIG. 2 is a similar view to that of FIG. 1 but this time showing the apparatus with the pivoted tester flange plate having the surface thereof substantially horizontal and showing by way of example the manner in which an adaptor flange can be fitted thereto in a spaced manner, the spacing being by, for example, a centrally ported adaptor plate capable of providing a sealed fluid tight communication from the tester flange plate therethrough by virtue, for example, of an O-ring mounted on the surface of the flange plate, and at the same time by virtue of, for example, an O-ring in the upper surface of the adaptor plate, a fluid type relationship with the plate being shown as being tested in FIG. 2, it being realised of course that a flange such as that shown attached to the apparatus in FIG. 2 would normally have a length of pipe flange or the like member issuing centrally therefrom to be tested by the apparatus.

In the preferred form of the present invention the tester flange plate 1 is pivotally mounted at 2 and 3 to the stable frame member 4 and is arranged so that it can pivot between the condition as shown in FIG. 1 and that shown in FIG. 2. Centrally passing through the tester flange plate 1 is a bore or port 5 (see FIG. 4) which is recessed via a recess 6 in from the upper surface or alternatively has skirting therearound an O-ring capable of acting as a seal.

Figure 3:
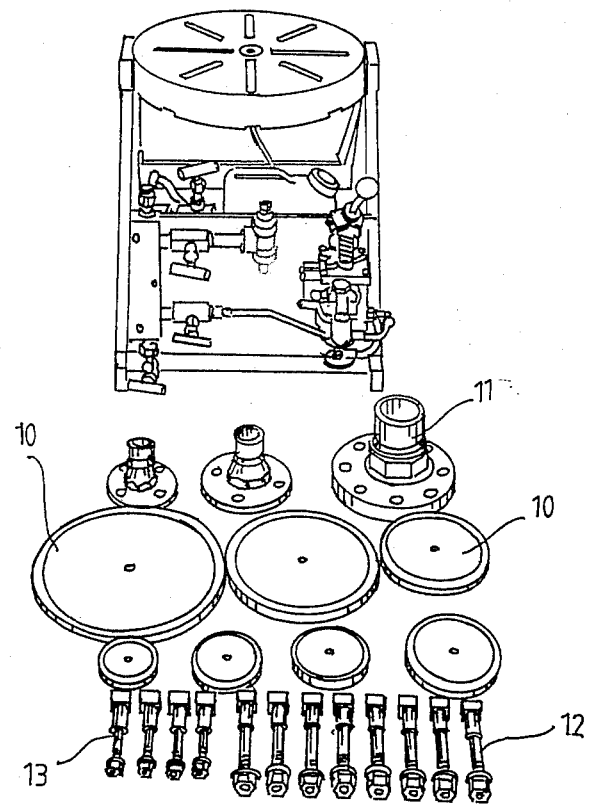
FIG. 3 shows another view of apparatus in accordance with the present invention showing below the apparatus a range of standard adaptor flanges engageable to the apparatus in accordance with the present invention and providing, for example, screw thread engagement to a pipe or other apparatus if deemed appropriate, a range of different sized centrally ported adaptor spacer plates capable of providing the requisite fluid tightness between the tester flange plate and the flanged apparatus to be tested or the adaptor plates as just previously mentioned, and finally showing a range of different types of bolt members capable of being located through the radial slots of the tester flange plate and protruding through and receiving a nut to hold the adaptor flange/adaptor plate assembly and the device to be tested to the pivoted flange plate.

Preferably an adaptor plate 10 such as laid out in FIG. 3 or shown specifically in FIGS. 17 and 18 can have the boss portion 7 with its bore 8 therethrough positioned into the bore 5 (if 6 is not an O-ring) or in the larger opening if 6 is a recessed shoulder and be clamped under pressure down to provide a fluid tight connection from the bore 5 through the bore 8 into the device being tested which is preferably sealed by use of the O-ring 9 shown in FIG. 17.

The adaptor plates 10 are preferably provided in a variety of different sizes as depicted in FIG. 3. The tester flange plate 1 can be adapted to receive thereon a range of different sized adaptor flanges 11 which can in turn be engaged by screw fitting or other means to the actual apparatus to be tested. The present invention however, utilising bolts (as shown for example in FIG. 3 by reference numerals 12 and 13—shown in FIGS. 13 and 14 and 11 and 12 respectively) mounted from the plate 1, by the use of the slots 14 and 15 therethrough in the manner as usually depicted by reference to FIG. 1, is suitable for clamping a flange of a pipe or valve over the adaptor plate.

A conduit 16 from the plate support manifold can supply gas or liquid under pressure by virtue of the use of the apparatus as depicted which can be operated in a manner which is obvious from the flow diagram of FIG. 16. A person skilled in the art will appreciate the advantages the present invention provides. Referring to the preferred embodiment the following can be stated in relation to a specific preferred pressure testing apparatus.

This is a device primarily designed for the testing of control and relief valves in the low to medium pressure range, i.e. 0–5000 psi.

The device consists of a frame upon which is povoted a tester flange plate which is preferably a round slotted steel plate. This plate is attached to a hydraulic pump via the conduit 16 which may be a flexible hose, valve manifold and steel tube.

Adaptor plates are used on the tester flange plate to enable various sizes of equipment to be bolted to it. Also included are three screwed adaptor flanges which can be mounted on the tester flange plate. Four hold-down bolts of ½" diameter and eight hold-down bolts ¾" diameter are used for clamping purposes.

The function of the device is that a valve or item to be tested is placed on the tester flange plate via the appropriate adaptor plate and pressure tested with the pump or nitrogen, the test pressure being recorded by a test gauge or recorder mounted on the valve manifold.

Adaptor plate sizes and maximum pressure ratings are as follows:

| | |
|---|---|
| 1. 8" | 150 lb |
| 2. 6" | 900 lb |
| 3. 4" | 900 lb |
| 4. 2½" | 900 lb |
| 5. 2" | 900 lb |
| 6. 1½" | 900 lb |
| 7. 1" | 900 lb |

Note ¾" devices can be direct mounted to the tester flange plate. Some of the uses for the tester apparatus are as follows:
1. Setting of relief valves.
2. Pressure testing of valves.
3. Leak testing of valves.
4. Pressure testing of pipelines.
5. As a comparison pump for calibrating gauges.

What is claimed is:
1. Pressure testing apparatus, comprising:
 a stable frame capable of being supported on a substantially flat support surface;
 a flange locating assembly pivotally mounted to said frame about a pivot axis, said flange locating assembly having a surface and a pressurized fluid egress port over which a flange of an object to be tested can be mounted in a substantially fluid tight manner with respect to said surface;
 pivotal means provided on said frame for pivotally mounting said flange locating assembly to said frame;
 fluid supply means mounted on said frame for providing fluid under pressure or for receiving fluid under pressure;

means for providing a fluid tight communication of pressurized fluid between said fluid supply means and said egress port;

said flange locating assembly being pivotable relative to said frame between at least two angular dispositions, whereby said flange locating assembly is connectable to said flange of said object to be tested under fluid pressure from said egress port in at least one of said at least two angular dispositions.

2. Apparatus as claimed in claim 1, wherein said fluid supply means includes a calibration gauge means.

3. Apparatus as claimed in claim 1 or 2, wherein said flange locating assembly is capable of supporting said flange of said object in a horizontal disposition.

4. Apparatus as claimed in claim 1 or 2, wherein said flange locating assembly is capable of supporting said flange of said object in a vertical disposition.

5. Apparatus as claimed in claim 1, wherein said flange locating assembly includes a radially slotted member having radial slots not extending to said egress port, said radial slots allowing bolt means to project therethrough and through bolt holes included in said flange of said object to be tested.

6. Apparatus as claimed in claim 1, wherein packing means comprising adaptor plates are provided for interposition between said surface and said flange of said object to be tested.

7. Apparatus as claimed in claim 6, wherein said packing means includes at least one sealing "O" ring disposed about a port in alignment with said egress port.

8. Apparatus as claimed in claim 1, wherein said fluid supply means comprises a hydraulic pump and reservoir means carried by said frame.

* * * * *